United States Patent
Bulman et al.

(10) Patent No.: US 6,393,181 B1
(45) Date of Patent: May 21, 2002

(54) TEMPERATURE STABLE BRAGG GRATING PACKAGE WITH POST TUNING FOR ACCURATE SETTING OF CENTRE FREQUENCY

(75) Inventors: Jonathan Mark Bulman, Cremorne; Hugh Gregory Inglis, Gymea Bay, both of (AU)

(73) Assignee: JDS Uniphase Pty. Ltd. (AU)

( * ) Notice: Subject to any disclaimer, the term of this patent is extended or adjusted under 35 U.S.C. 154(b) by 0 days.

(21) Appl. No.: 09/446,160
(22) PCT Filed: Jun. 18, 1998
(86) PCT No.: PCT/AU98/00473
§ 371 Date: Dec. 16, 1999
§ 102(e) Date: Dec. 16, 1999
(87) PCT Pub. No.: WO98/59267
PCT Pub. Date: Dec. 30, 1998

(30) Foreign Application Priority Data

Jun. 19, 1997 (AU) .............................. PO7458

(51) Int. Cl.[7] ................................................. G02B 6/34
(52) U.S. Cl. ............................ 385/37; 385/13; 385/123
(58) Field of Search ............................ 385/13, 37, 24, 385/123

(56) References Cited

U.S. PATENT DOCUMENTS

| | | |
|---|---|---|
| 5,042,898 A * | 8/1991 | Morey et al. .................. 385/37 |
| 5,367,589 A | 11/1994 | MacDonald |
| 5,613,023 A | 3/1997 | Guillon |
| 5,774,619 A * | 6/1998 | Bruesselbach .............. 385/137 |
| 5,841,920 A * | 11/1998 | Lemaire et al. ............... 385/37 |
| 5,991,483 A * | 11/1999 | Engelberth .................... 385/37 |
| 6,144,789 A * | 11/2000 | Engleberth et al. ........... 385/37 |
| 6,147,341 A * | 11/2000 | Lemaire et al. ............... 385/37 |
| 6,181,851 B1 * | 1/2001 | Pan et al. ..................... 385/37 |

FOREIGN PATENT DOCUMENTS

| | | |
|---|---|---|
| WO | 9110151 | 7/1991 |
| WO | 9530926 | 11/1995 |
| WO | 9726572 | 7/1997 |

* cited by examiner

Primary Examiner—Darren Schuberg
Assistant Examiner—Fayez Assaf
(74) Attorney, Agent, or Firm—Ladas & Parry

(57) ABSTRACT

A method of accurately setting the center wavelength of a fiber grating fixed in a temperature compensation package, the method comprising the steps of: fixing the grating to the package and altering the size of the package in a post processing step. The altering step can comprise elongating or compressing the package so as to substantially permanently alter the size of the package. The temperature compensation package can comprise: a first elongated member having a first coefficient of thermal expansion; two second elongated members, one each attached to the ends of the first elongated member and having their other second ends closer together than the ends of the first elongated member, the second elongated members having a second coefficient of thermal expansion relatively more than the first coefficient of thermal expansion; and two material matching members attached to the second ends and adapted to provide for material matching fixing mixtures to the second elongated members; the fixing mixtures to the second elongated members; the fixing mixtures fixing ends of the fiber grating to the temperature compensation package. The fixing mixture can comprise glass of metal solder. The material matching members are preferably located within an aperture in the second ends.

5 Claims, 2 Drawing Sheets

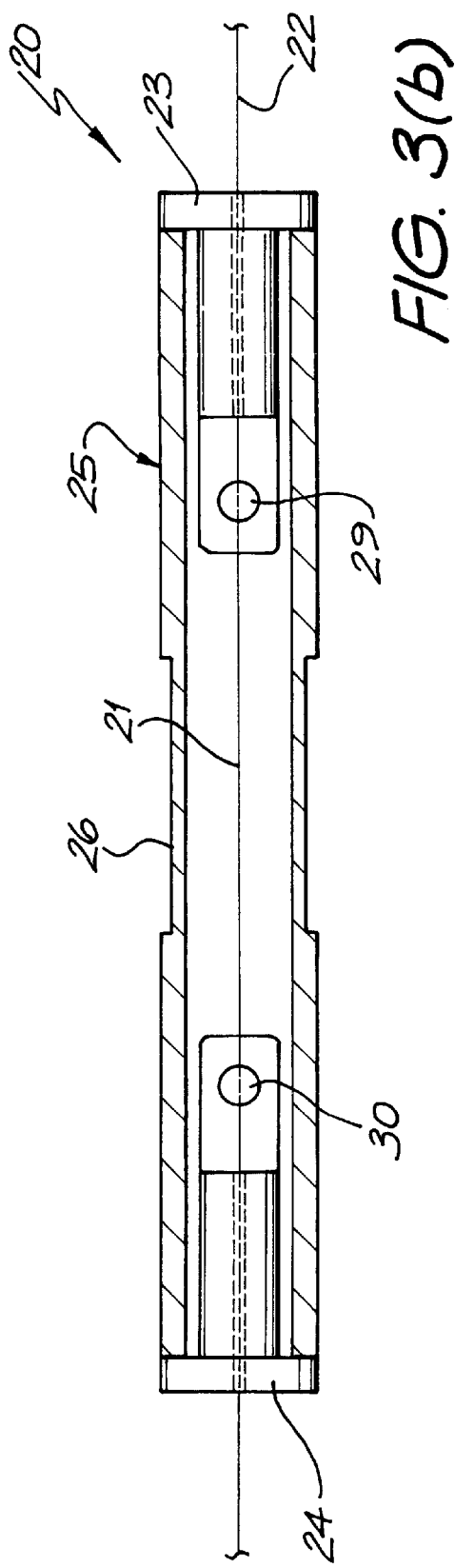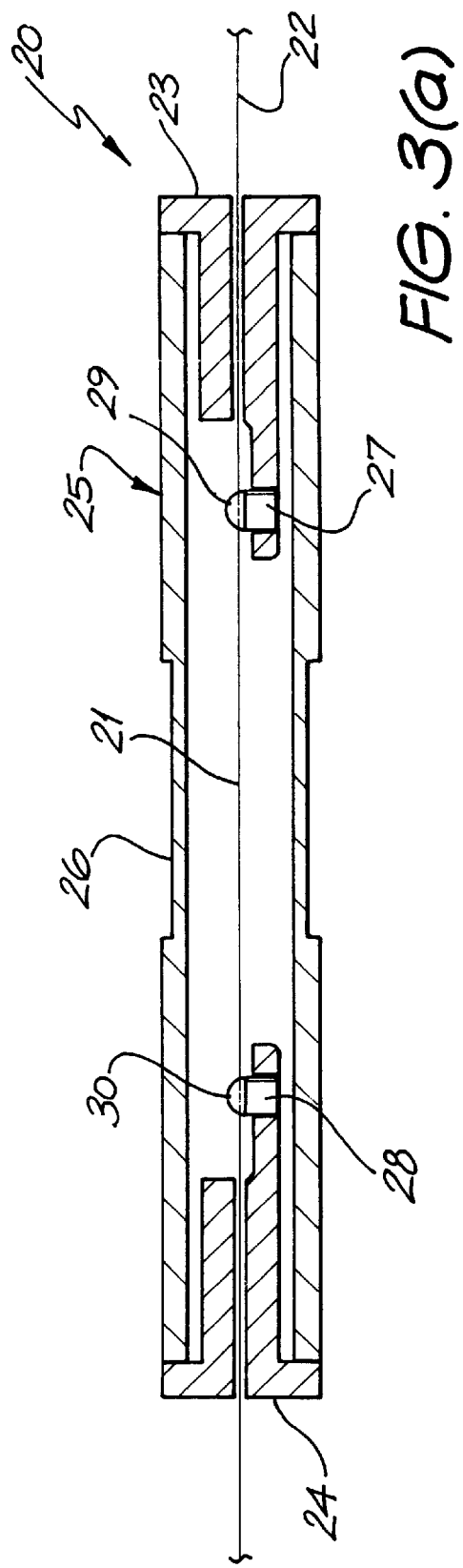

US 6,393,181 B1

TEMPERATURE STABLE BRAGG GRATING PACKAGE WITH POST TUNING FOR ACCURATE SETTING OF CENTRE FREQUENCY

FIELD OF THE INVENTION

The present invention relates to the construction of a package for an optical fibre Bragg grating so as to facilitate accurate setting of the centre frequency. The preferred embodiment including a package which provides a stable centre frequency at a range of temperatures.

BACKGROUND OF THE INVENTION

Bragg gratings are well known in the field of optical fibre construction and normally comprise a repeating pattern written into a photosensitive optical fibre by a UV light source or the like unfortunately, the modulating pattern is normally inherently highly sensitive to the effects of strain and temperature. This is a disadvantage in that in applications, such as communications or sensing systems, it is often a requirement that the optical characteristics of the grating are not influenced by the effects of temperature or strain. For this reason, it is a typical requirement to mount the grating in a package so as to isolate the grating region from external strain or temperature effects.

In FIG. 1, there is shown a simple grating package 1 which mounts a fibre 2 at two ends of a package mount 3 by means of fixing with epoxy 4. Unfortunately, with this arrangement expansion of the package 3 with temperature relative to the fibre 2 will result in a change in tension on the fibre 2.

In FIG. 2, there is shown a slightly more complex arrangement 10 which includes a temperature compensating package which uses a combination of materials with differing thermal expansions. A first material 11 is utilised to expand at a first low rate while a second material comprising end portions 12, 13 expands with temperature at a substantially higher rate. The combined expansions of the two forms of material 11, 12 and 13 produces a more stable arrangement whereby the fibre fixing points 15, 16 are maintained thereby maintaining the overall strain on the fibre 18 in the intermediate region so as to counteract the effect of temperature on the centre frequency.

In some applications, the temperature characteristic may not require specific compensating. However, it may be the case, such as when utilising the arrangement 1 of FIG. 1, that the fibre is still required to be packaged under strain so as to achieve a greater wavelength accuracy than that which can be achieved in the fibre writing process.

In the majority of packaged Bragg fibre gratings, the fibre is held under strain. When fixing the fibre to the package, a number of techniques may be employed. These include epoxy adhesive or glass "fritting". These processes often require heat and as a result, they can have a further effect on the wavelength of the grating making it difficult to distinguish between the effects of strain or heat when setting the fibre in the package and setting the corresponding wavelength. Further, typical methods for fixing the fibre to the package may have some shrinkage effects as either the epoxy cures or the glass frit sets. The shrinkage can further introduce unwanted changes to the strain on the fibre which result in an alteration of the wavelength setting.

Further, the materials utilised often require that an epoxy resin or the like is used to affix the fibre to the package. This can induce the problem of creep wherein, over time, the characteristics of the wave guide change due to creep of the adhesive material relative to the package or to the fibre. Unfortunately, epoxy can be undesirably humidity sensitive. The unavoidable use of an epoxy is often required to be utilised due to the necessity to maintain compatibility of materials.

SUMMARY OF THE INVENTION

It is an object of the present invention to provide an improved temperature stable optical fibre package.

In accordance with a first aspect of the present invention, there is provided a method of accurately setting the centre wavelength of a fibre grating fixed in a temperature compensation package, the method comprising the steps of fixing the grating to the package and altering the size of the package in a post processing step.

The altering step can comprise elongating or compressing the package so as to substantially permanently alter the size of the package.

The temperature compensation package can comprise a first member having a first coefficient of thermal expansion; two second members, one each attached to the ends of the first member and having their other second ends closer together then the ends of the first member, the second members having a second coefficient of thermal expansion relatively more then the first coefficient of thermal expansion; and two material matching members attached to the second ends and adapted to provide for material matching fixing mixtures to the second members; said fixing mixtures fixing ends of the fibre grating to the temperature compensation package.

The fixing mixture can comprise glass or metal solder.

The material matching members are preferably located within an aperture in the second ends.

In accordance with a further aspect of the present invention, there is provided a temperature stable grating package having an accurately fixable centre frequency, the package including: fixing means for fixing a grating fibre to the package; temperature compensation means for compensating for any fluctuations in temperature of the package; and package length alteration means for altering the length of the package so as to accurately and substantially fix the centre frequency of the grating.

The temperature compensation means can comprise: a first member having a first coefficient of thermal expansion; two second members, one each attached to the ends of the first member and having their other second ends closer together then the ends of the first member, the second members having a second coefficient of thermal expansion relatively less then the first coefficient of thermal expansion; and two material matching members attached to the second ends and adapted to provide for material matching fixing mixtures to the second members; and the fixing means fixing ends of the fibre grating to the temperature compensation package.

The fixing means comprise glass or metal solder and the material matching members can be located within an aperture in the second ends.

In accordance with a further aspect of the present invention, there is provided a temperature stable grating package including: fixing means for fixing a grating fibre to the package; temperature compensation means for compensating for any fluctuations in temperature of the package; wherein the temperature compensation means can comprise: a first member having a first coefficient of thermal expansion; two second members, one each attached to the ends of the first member and having their other second ends closer together then the ends of the first member, the second members having a second coefficient of thermal expansion relatively less then the first coefficient of thermal expansion; and two material matching members attached to the second ends and adapted to provide for material matching fixing mixtures to the second members; and the fixing means fixing ends of the fibre grating to the temperature compensation package.

The fixing means can comprise glass or metal solder.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 3(a) and FIG. 3(b) illustrate schematically the structure of the preferred embodiment.

DESCRIPTION OF THE PREFERRED AND OTHER EMBODIMENTS

Figure 1:
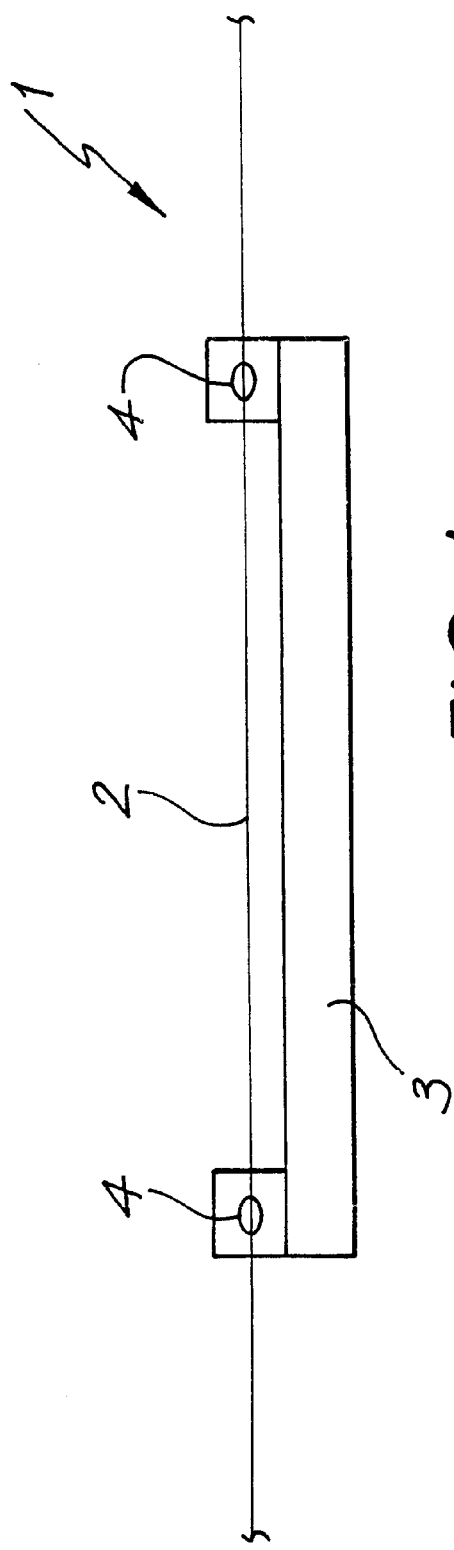
FIG. 1 illustrates a simple grating package as utilised in the prior art.
Figure 2:
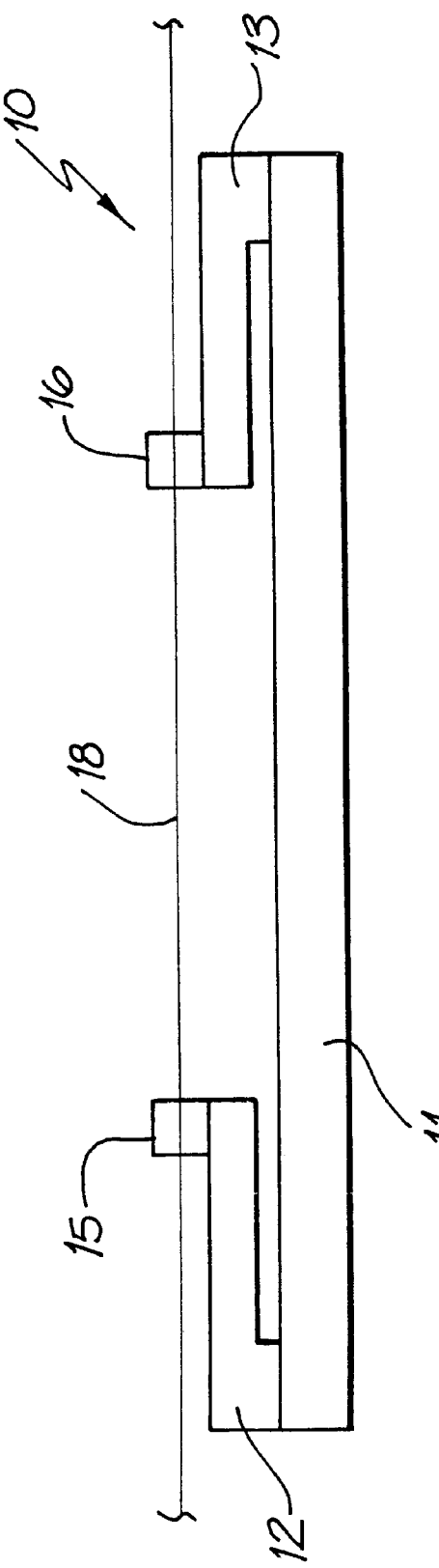
FIG. 2 illustrates a temperature compensation package as known in the prior art.

In accordance with the preferred embodiment of the present invention there is provided an apparatus for providing a tunable Bragg grating with the apparatus separating the problem of setting the centre wavelength from that of fixing or mounting the fibre to the package. This is achieved by first fixing the fibre to the package and then applying a post fixing "tune" so as to tune the wavelength of the grating in accordance with requirements.

Further, through the utilisation of an intermediate material which has a coefficient of thermal expansion similar to the glass fibre and a supporting platform and is also compatible for the use of glass or metal solder the problem of the difficulty in utilising epoxy or polymer adhesives, especially in their sensitivity to humidity, is alleviated and an improved package results.

Turning now to FIG. 3(a) and FIG. 3(b), there is illustrated one form of the preferred embodiment with FIG. 3(a) showing a side sectional view and FIG. 3(b) showing a top sectional view. The preferred embodiment 20 is designed to maintain a previously written grating 21 on a fibre 22 in a highly stable environment such that the grating frequency can be readily set. The package 20 includes two end portions 23, 24 made of a first material, such as stainless steel, having a high coefficient of thermal expansion. A second cylindrical member 25 is provided and, importantly, includes a thinned section 26 which is provided for post tuning of the wavelength.

Each of the members 23, 24 include a cylindrical hole in which is mounted a Kovar platform e.g. 27, 28. The Kovar platform can be slotted into a hole formed in the corresponding member 23, 24. The Kovar platform e.g. 27, 28 provides for a material matching capability between the Kovar platform and a solder material 29, 30 which is utilised to affix the fibre 22 to the package. In this way, the necessity to utilise a polymer adhesive can be dispensed with providing for longer term stability.

Of course, many different materials can be utilised for the platform 27, 28. For example, Kovar or invar may be utilised, zirconia ceramic and some other silica materials could be utilised. Ideally, each member e.g. 26, 23, 24 and 27 and 28 are laser welded together where laser welding is suitable.

The arrangement 20 thereby provides for the utilisation of a glass or metal solder (frit) and eliminates the need to utilise any polymer adhesive thereby reducing the effects of long term creep and providing for higher long term stability.

The first step of the preferred embodiment therefore comprises manufacturing the package arrangement and fixing the fibre 22 in place. The wavelength setting at this stage is not critical but is preferably lower than that desired in the final device.

After the fibre has been fixed and any post fixing shrinking has occurred, the package 20 can be expanded or compressed in an axial direction. The stretching can be achieved by a controlled force around a thinned portion 26 so as to permanently elongate the package. Alternatively, compression can be utilised to compress the size of the package. Preferably, the packages constructed from such materials as steel, kovar or invar which can be plastically deformed. The deformation achieves a permanent change in length which in turn alters the strain on the optical fibre Bragg grating in middle area 21 thereby varying the centre wavelength.

It has been found in practice that the range of increase in length required to provide a full range of tuning for-most applications is typically less than 5 μm. The post tuning operation is preferably carried out at the temperature of operation of the device thereby providing a resulting package which provides an accurate wavelength at a given temperature irrespective of the residual characteristic of the device across a temperature range.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

We claim:

1. A method of tuning a Bragg grating that is embodied in an optical fiber and which comprises the steps of positioning the optical fiber within a metal, temperature compensating package with the grating-containing region of the fiber located between spaced-apart fiber anchoring points within the package; securing axially spaced portions of the fiber to the anchoring points without subjecting the—package—to tensile strain, and, thereafter, progressively elongating the package and the contained fiber to an extent sufficient to effect permanent plastic deformation of the package and to induce tensile strain in the grating region of the fiber and so tune the grating to a required center wavelength.

2. The method as claimed in claim 1, wherein the package into which the fiber is positioned comprises a first metal member extending parallel to the fiber and two second metal members secured to the first member and extending parallel to the first member, the second members having respective inner ends which provide the anchoring points for the fiber and outer ends that are secured to end regions of the first member, the first member being formed from a metal having a first coefficient of thermal expansion and the second member being formed from a metal having a coefficient of thermal expansion that is greater than that of the first member.

3. The method as claimed is claim 1, wherein the fiber is secured to the respective anchoring points by glass solder.

4. The method as claimed in claim 1, wherein the fiber is secured to the respective anchoring points by metal solder.

5. The method as claimed in claim 1, wherein the fiber is secured to the respective anchoring points by an epoxy resin.

* * * * *

UNITED STATES PATENT AND TRADEMARK OFFICE
CERTIFICATE OF CORRECTION

PATENT NO. : 6,393,181 B1  Page 1 of 1
DATED : May 21, 2002
INVENTOR(S) : Bulman et al.

It is certified that error appears in the above-identified patent and that said Letters Patent is hereby corrected as shown below:

Column 4,
Line 43, "the-package-to" should read -- the package to --

Signed and Sealed this

Nineteenth Day of November, 2002

Attest:

Attesting Officer

JAMES E. ROGAN
Director of the United States Patent and Trademark Office